United States Patent
Pearson et al.

(10) Patent No.: US 10,731,981 B2
(45) Date of Patent: Aug. 4, 2020

(54) DEVICE AND METHOD FOR COMBINED ALTITUDE DISPLAY

(71) Applicant: ELBIT SYSTEMS OF AMERICA, LLC, Fort Worth, TX (US)

(72) Inventors: John Timothy Pearson, Fort Worth, TX (US); Lawerance Ray Butler, Aledo, TX (US); Keith Thomas Grandin, Weatherford, TX (US); Michael Allen Robb, Bedford, TX (US); Donald Grant Gwynne, Arlington, TX (US)

(73) Assignee: Elbit Systems of America, LLC, Fort Worth, TX (US)

( * ) Notice: Subject to any disclaimer, the term of this patent is extended or adjusted under 35 U.S.C. 154(b) by 228 days.

(21) Appl. No.: 15/873,303

(22) Filed: Jan. 17, 2018

(65) Prior Publication Data

US 2019/0025054 A1 Jan. 24, 2019

Related U.S. Application Data

(60) Provisional application No. 62/535,810, filed on Jul. 21, 2017.

(51) Int. Cl.
*G01C 5/00* (2006.01)
*G01C 5/06* (2006.01)

(52) U.S. Cl.
CPC ............ *G01C 5/005* (2013.01); *G01C 5/06* (2013.01)

(58) Field of Classification Search
CPC .................... G01C 5/005; G01C 5/06
USPC ............................................. 73/384
See application file for complete search history.

(56) References Cited

U.S. PATENT DOCUMENTS

| 3,115,628 A | 12/1963 | Sikora |
| RE26,228 E * | 6/1967 | Larson .......... G05D 1/042 244/181 |
| 3,537,086 A | 10/1970 | Andresen, Jr. |
| 3,555,908 A | 1/1971 | Ganley |
| 3,638,092 A * | 1/1972 | Kammerer .......... G05D 1/0607 318/584 |
| 3,936,797 A | 2/1976 | Andresen |

(Continued)

OTHER PUBLICATIONS

Zaliva, Vadim et al.: "Barometric and GPS Altitude Sensor Fusion", 2014 IEEE International Conference on Acoustic, Speech and Signal Processing, 2014, pp. 7575-7579.

(Continued)

*Primary Examiner* — Octavia Hollington
(74) *Attorney, Agent, or Firm* — K&L Gates LLP

(57) ABSTRACT

A combined altitude display apparatus for generating a combined altitude value is provided. The apparatus comprises a first altitude input interface, wherein the first altitude input interface receives a first altitude value; a second altitude input interface, wherein the second altitude input interface receives a second altitude value, wherein the second altitude value indicated by the second altitude input interface has a cyclical range; an altitude output interface, wherein the altitude output interface outputs a third altitude value; and a data fusion component coupled to the first altitude input interface and the second altitude input interface and configured to calculate the third altitude value based on the first altitude value and the second altitude value.

20 Claims, 6 Drawing Sheets

(56) References Cited

U.S. PATENT DOCUMENTS

| | | | | |
|---|---|---|---|---|
| 4,224,669 A * | 9/1980 | Brame | ............... | G01C 5/005 |
| | | | | 340/970 |
| 4,431,994 A * | 2/1984 | Gemin | ............... | G01C 5/06 |
| | | | | 340/970 |
| 6,216,064 B1 | 4/2001 | Johnson et al. | | |
| 7,725,220 B2 * | 5/2010 | Petrich | ............... | G01C 23/00 |
| | | | | 701/10 |
| 8,077,078 B1 | 12/2011 | Woodell et al. | | |
| 8,949,025 B2 * | 2/2015 | Garin | ............... | G01S 19/22 |
| | | | | 342/357.28 |
| 2007/0040732 A1 | 2/2007 | Burgett et al. | | |
| 2011/0258157 A1 | 10/2011 | Vaidyanathan et al. | | |
| 2013/0197800 A1 * | 8/2013 | Haran | ............... | G01S 19/40 |
| | | | | 701/445 |
| 2014/0019065 A1 * | 1/2014 | Chabot-Couture | ..... | G06F 15/00 |
| | | | | 702/24 |

OTHER PUBLICATIONS

Analog Devices Inc.: "ADIS16448 Compact, Precision Ten Degrees of Freedom Inertial Sensor Data Sheet", Product Data Sheet, Jun. 2017.

International Search Report and Written Opinion for PCT Application No. PCT/US2018/043156 dated Nov. 6, 2018.

* cited by examiner

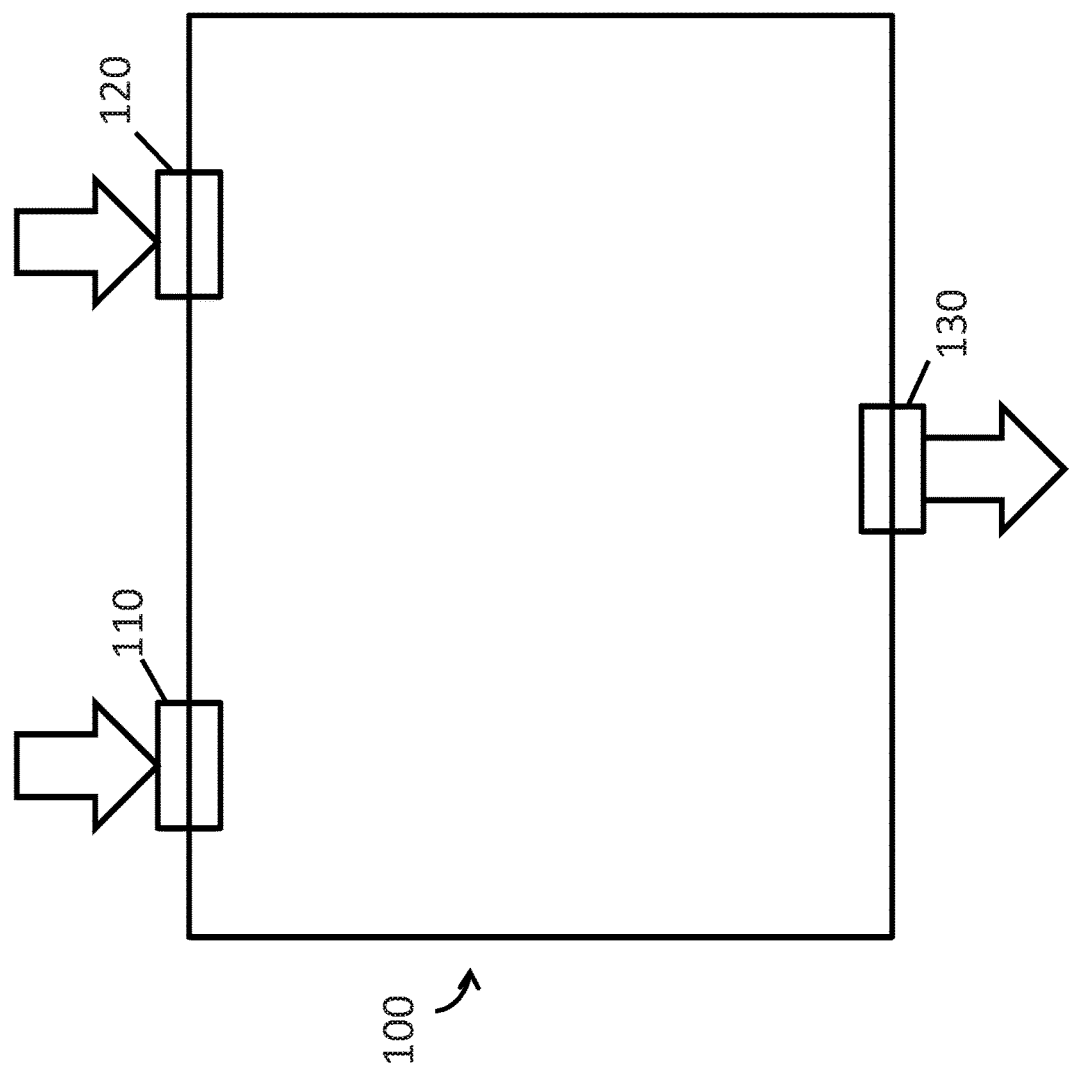

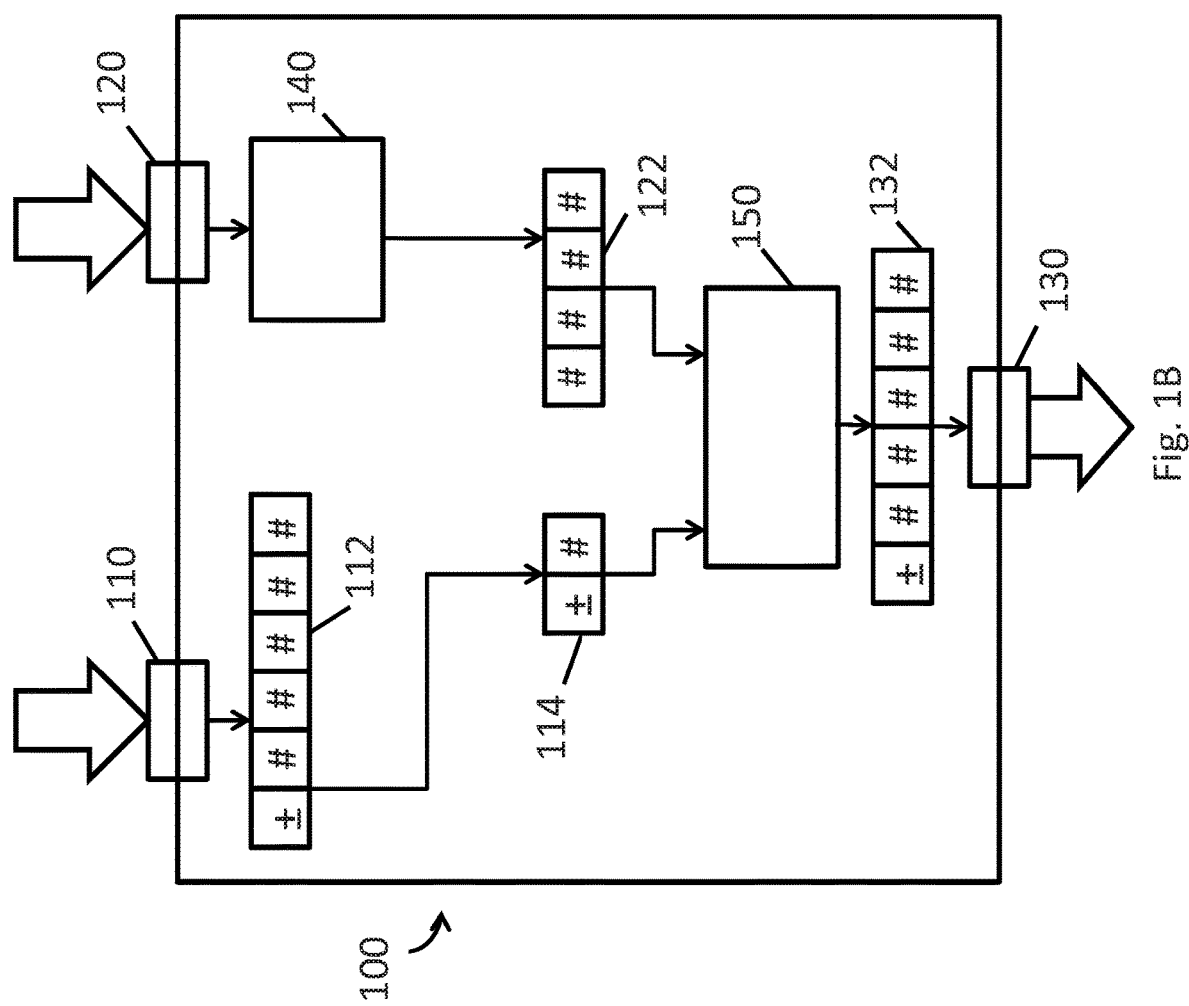

DEVICE AND METHOD FOR COMBINED ALTITUDE DISPLAY

CROSS-REFERENCE TO RELATED APPLICATIONS

This application claims the benefit of U.S. Provisional Application Ser. No. 62/535,810 filed Jul. 21, 2017 and titled "DEVICE AND METHOD FOR COMBINED ALTITUDE DISPLAY," which is hereby incorporated by reference in its entirety.

BACKGROUND

Altimeters are a class of instruments that indicate an estimated altitude. Altimeters are commonly used in aircraft, though they can also be used in other circumstances, such as skydiving and surveying. There are different kinds of altitude, such as true altitude (the height above mean sea level) and absolute altitude (height above ground level in the local area). Unless otherwise indicated, altitude, as used herein, generally refers to true altitude (the height above mean sea level).

Different kinds of altimeters are known in the art. Each has advantages and disadvantages. For example, a radar-based altimeter can estimate absolute altitude, but may require additional information to calculate an estimated true altitude and can have issues with uneven terrain or foliage. A global positioning system (GPS) can provide true altitude, but GPS may not always be available, such as due to obstruction of the satellite signals. Barometric pressure may also be used to estimate true altitude (as barometric pressure generally decreases as altitude increases), but can be affected by local weather conditions, such as high pressure or low pressure zones and temperature. Thus, a need exists for an aircraft altimeter with increased accuracy over a large altitude range.

SUMMARY

An apparatus may comprise a first altitude input interface that receives a first altitude value, a second altitude input interface that receives a second altitude value with a cyclical range, an altitude output interface that outputs a third altitude value, and a data fusion component coupled to the first altitude input interface and the second altitude input interface and configured to calculate the third altitude value based on the first altitude value and the second altitude value. A method for generating a combined altitude value may comprise receiving, by a first input interface, a first altitude value, receiving, by a second input interface, a second altitude value with a cyclical range, calculating, by a data fusion component, a third altitude value based on the first altitude value and second altitude value, and outputting the third altitude value. A computer system may comprise a processor, a memory coupled to the processor, wherein the memory stores a program that, when executed by the processor, causes the processor to receive a first altitude value, receive a second altitude value with a cyclical range, calculate a third altitude value based on the first altitude value and the second altitude value, and output the third altitude value.

BRIEF DESCRIPTION OF THE DRAWINGS

For a detailed description of exemplary embodiments of the disclosure, reference will now be made to the accompanying drawings in which:

FIG. 1A shows an apparatus for fusing two dissimilar altitude sources, in accordance with various embodiments;

FIG. 1B shows a detailed view of an apparatus for fusing two dissimilar altitude sources, in accordance with various embodiments;

DETAILED DESCRIPTION

Figure 2:
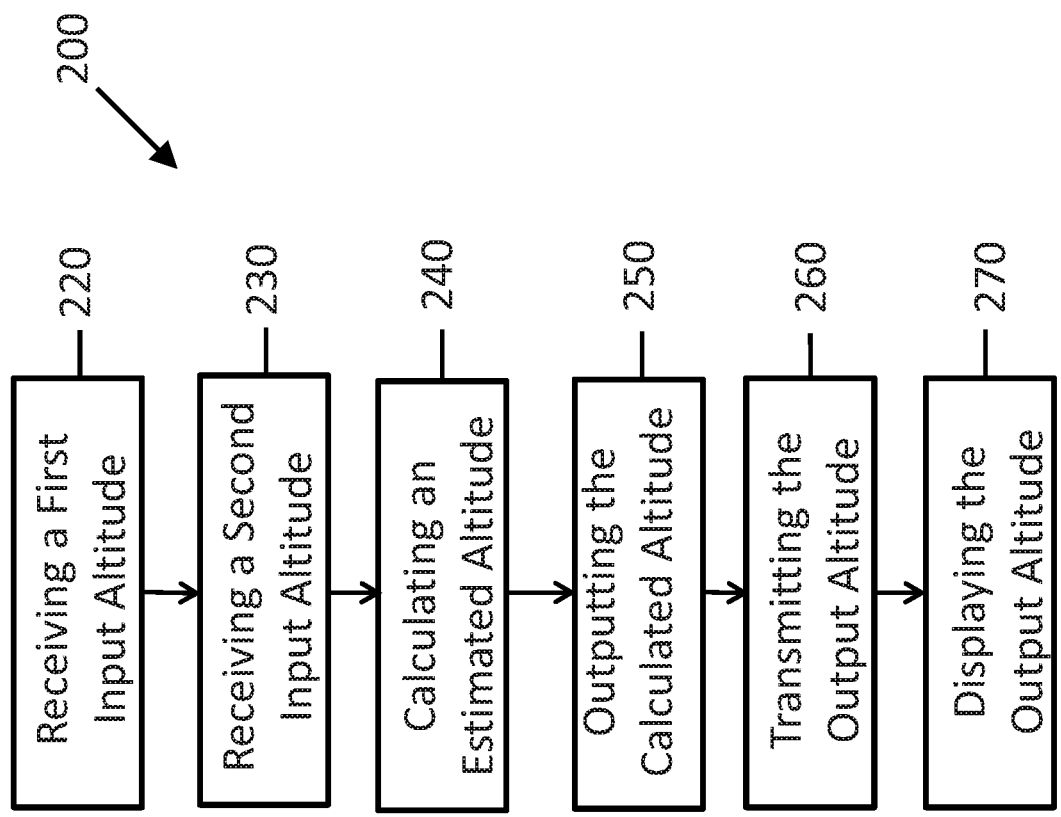
FIG. 2 shows a flowchart of a method of fusing two altitude sources, in accordance with various embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The disclosure relates to the fusing of data from two different sources of altitude. Fusing of data may result in an improved altitude estimation that builds on the strengths of both altitude sources, while minimizing their disadvantages. FIG. 1A shows an apparatus for combining two dissimilar altitude sources 100, in accordance with various embodiments. In at least some embodiments, the apparatus 100 includes an input interface for a first altitude source 110, an input interface for a second altitude source 120, and an output interface for a combined altitude 130. The interfaces 110, 120, 130 may be digital, analog, or some combination of the two. In at least some embodiments, the interfaces 110, 120, 130 may use some or all of the same physical elements (e.g., they may be multiplexed over the same bus or wires).

FIG. 1B shows a detailed view of an apparatus for fusing two dissimilar altitude sources 100, in accordance with various embodiments. In at least some embodiments, the interface for the first altitude source 110 is a digital interface and receives the first altitude value from an altimeter or a sensor as a binary number representing an integer 112. The integer 112 may include a sign (such as a plus to indicate the altitude is above sea level or a minus to indicate the altitude is below sea level). The integer 112 may also include one or more numerical digits representing a distance (such as the number of feet or meters above or below sea level). In the embodiment depicted in FIG. 1B, integer 112 includes a sign and 5 digits, allowing the integer 112 to indicate altitudes between 99,999 feet below sea level (−99,999) through 99,999 feet above sea level (+99,999). The number of digits may correspond to the number of displayed digits on an instrumentation panel. In at least some embodiments, the integer 112 may be implemented as a binary number, such as a 32-bit number.

In various embodiments, the interface for the second altitude source 120 may be an analog interface, and the interface for the second altitude source 120 may receive one or more voltage (or other analog) signals representative of an altitude, such as from an altimeter. The analog signals may scale linearly or non-linearly with the represented altitude. When the interface for the second altitude source 120 is an analog interface, altitude source 100 may further comprise a converter 140, which may be coupled to the interface for the second altitude source 120. A converter 140 can be used to change the analog value(s) into a binary number representing an unsigned integer 122 indicating the estimated altitude. The details of the converter 140 depend on the specific input signal being converted, but may include one or more analog-to-digital converters and logic to calculate the estimated altitude from the converted signals, possibly including scaling and offsetting (or other manipulation) to produce the unsigned integer 122 indicating the estimated altitude. In at least some embodiments, the interface for the second altitude source 120 may be a digital interface and may not require a converter 140.

In at least some embodiments, the interface for the first altitude source 110 may be an analog interface. In such embodiments, the apparatus 100 may include a component similar to converter 140, but which can convert the analog signal from an analog interface for the first altitude source 110 to a digital value that may be scaled and offset (or otherwise manipulated) to produce a binary number representing an integer 112 indicating an altitude.

In accordance with various embodiments, the interface for the second altitude source 120 may receive one or more signals corresponding to a synchro. A synchro can be used to measure or transmit angle information, such as the angle of an indicator on a dial. This can, for example, be used to measure the dial's angle, or to transmit the angle to which a dial should be pointed. In at least some embodiments, the synchro signal may have a cyclical range, e.g., it may only be able to specify angles from 0 to 360 degrees (or some multiple of 360 degrees), though it may be capable of cycling through the range multiple times by rolling over past 360 degrees or rolling under past 0 degrees. Thus, a synchro signal indicating 360 degrees may be indistinguishable from a synchro signal indicating 0 degrees. A roll-over occurs when the signal increases past the highest value, for example increasing from 359 degrees to 360 degrees to 1 degree. A roll-under occurs when the signal decreases past the lowest value, for example decreasing from 1 degree to 0 degrees to 359 degrees. The angle indicated by the synchro signal may represent an altitude, for example 0 degrees may represent 0 feet, 180 degrees may represents 5000 feet, and 360 degrees may represent 10000 feet (though the signal for 360 degrees representing 10000 feet may be indistinguishable from the signal for 0 degrees representing 0 feet). The conversion from degrees to feet (or meters or some other unit of measurement) may be a linear or non-linear conversion.

In at least some embodiments, the interface for the second altitude source 120 may receive a signal with a cyclical range that can be converted into an unsigned integer 122 representing an estimated altitude. The unsigned integer 122 may include one or more digits representing an estimated altitude (in feet or other unit of measurement). In the embodiment depicted in FIG. 1B, unsigned integer 122 includes 4 digits, allowing the unsigned integer 122 to indicate altitudes from 0 feet through 9,999 feet. In embodiments using a cyclical range, a value of 0 in the unsigned integer 122 may indicate an altitude of 0 feet, 10,000 feet, negative 10,000 feet, or some other multiple of 10,000 feet. In at least some embodiments, the unsigned integer 122 may be implemented as a binary number, such as a 16-bit number.

Still referring to FIG. 1B, in various embodiments, the apparatus 100 for combining two dissimilar altitude sources may further comprise a data fusion component 150. The data fusion component 150 may be directly or indirectly coupled to the interface for the first altitude source 110, the interface for the second altitude source 120, and the output interface for a combined altitude 130. The data fusion component 150 uses information from the interface for the first altitude source 110 and the interface for the second altitude source 120 to generate a combined estimated altitude value 132. The data fusion component 150 may use the full altitude estimations received through the interfaces for the first and second altitude sources 110, 120, or only part of the information. As depicted in FIG. 1B, the data fusion component 150 may use only the sign and most significant digit of integer 112, while using all four digits of unsigned integer 122. In at least some other embodiments, the sign and more than one of the most significant digits of integer 112 may be used by the data fusion component 150. In at least some other embodiments, the entire value of integer 112 may be used by the data combiner. Similarly, in at least some other embodiments, only part of the unsigned integer 122 may be used by the data fusion component 150. In at least some other embodiments, the data fusion component 150 may use only certain bits of integer 112 or unsigned integer 122 (i.e., the binary 1s and 0s), rather than manipulating the numbers based on their base-10 representation.

While FIG. 1B shows at least one particular embodiment, other embodiments are disclosed. For example, the integer 112 and unsigned integer 122 may be any combination of number types, such as an integer, unsigned integer, floating point number, or fixed point number, and may have the same or a different number of digits (or number of bits in their binary representation) than the specific embodiments shown and discussed in relation to FIG. 1B.

FIG. 2 shows a flowchart of a method of combining two altitude sources 200, in accordance with various embodiments. The method 200 comprises receiving a first input altitude 220, receiving a second input altitude 230, calculating an estimated altitude 240 based on the first input altitude and second input altitude, outputting the calculated altitude 250, transmitting the output altitude 260, and displaying the output altitude 270. The second input altitude 230 may be received before, or concurrently with, the first input altitude 220.

Figure 3:
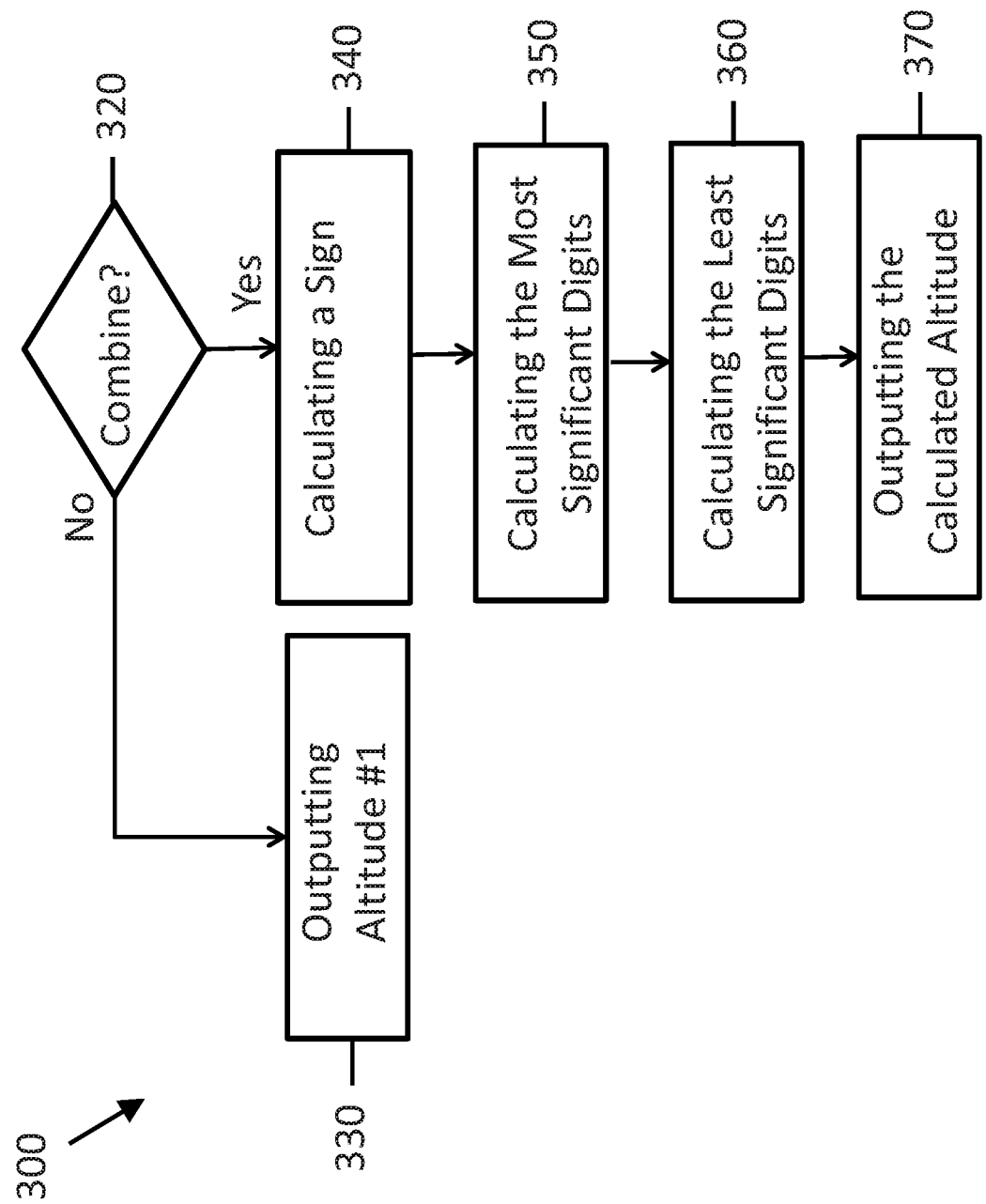
FIG. 3 shows a flowchart of a method of calculating altitude based on two altitude sources, in accordance with various embodiments.

FIG. 3 shows a flowchart of a method of calculating altitude based on two altitude sources 300, in accordance with various embodiments. In at least some embodiments, the method of FIG. 3 may implement steps 240 and 250 of FIG. 2. The method comprises deciding whether or not to combine the two altitude values 320, as discussed in detail below. The flowchart 300 proceeds to step 340 if the decision is "Yes" and to step 330 if the decision is "No." If the altitudes are not combined, the first input altitude is output as the calculated altitude 330. In at least some embodiments, step 330 may output the second altitude value instead of the first altitude value. If the altitudes are combined, the sign is calculated for the calculated altitude 340, the most significant digits are calculated for the calculated altitude 350, the least significant digits are calculated for the calculated altitude 360, and the calculated altitude is output 370. The calculating a sign 340, calculating the most significant digits 350, and calculating the least significant digits 360 may be performed in any order.

With continued reference to FIG. 3, in at least some embodiments the altitude sources may provide information about whether the altitude value is valid. An altitude value may be not valid due to an error or malfunction of the altitude source providing the altitude value. An altitude value may be not valid due to missing or outdated calibration information. An altitude value may be not valid if the altitude value has changed faster than is deemed possible for the aircraft or fixture in which the altitude source is located or for the altitude source to properly operate. An altitude source may also provide an "altitude data good" or similar signal to indicate whether or not its altitude value is valid. Step 320 may decide "No" if one or both of the altitude sources are not valid. In at least some other embodiments, step 320 may compare the two input altitude values to determine if they are similar enough to combine. For example, step 320 may decide "No" if the two altitude values differ by more than a certain value and/or by more than a percentage of each other. In various embodiments, one of the altitude values may have a cyclical range that is taken into account. For example, if one altitude value is 15500 feet and the other altitude value is 5500 feet with a cyclical range between 0 and 9,999, step 320 may compare only the four least significant digits of the two altitude values. In at least some other embodiments, step 320 may decide "No" if the first altitude value is above (or below) a threshold value, such as +10,000. In at least some other embodiments, step 320 may decide "No" based on additional data indicating the reliability or accuracy of one or both of the altitude values. Step 320 may take place after the combined altitude has been calculated, and the decision by step 320 is whether to output the combined altitude or only one of the altitudes from the altitude sources.

In at least some other embodiments, there may be one or more additional decisions to determine whether the first altitude value, second altitude value, or combined altitude is output. These decisions may be made based on factors such as indications of validity from the altitude sources, a comparison or analysis of the altitude values, additional data indicating the reliability or accuracy of one or both of the altitude values, and/or selection by an operator.

In at least some embodiments, step 340 may calculate the sign of the combined altitude value based on the sign of only one of the input altitude values, while in at least some other embodiments, step 340 may base the sign of the combined altitude value on the sign of both input altitude values. In addition, step 340 may also consider the most significant digits of one or both of the input altitude values in calculating the combined altitude value's sign. Furthermore, the entirety of one or both input altitude values may be considered in calculating the combined altitude value's sign in other embodiments.

In at least some embodiments, step 350 may calculate the most significant digits of the combined altitude value based only on one of the altitude inputs, or just the most significant digits of one of the altitude inputs. Alternatively, step 350 may use both altitude inputs (or the most significant digits from both altitude inputs) to calculate the most significant digits of the combined altitude value. In yet other embodiments, step 350 may calculate the most significant digits of the combined altitude value based on one of the altitude inputs (or the most significant digits from one altitude input) and a roll-over or roll-under condition of the other altitude input.

Step 360 comprises calculating the least significant digits. In at least some embodiments, step 360 may calculate the least significant digits of the combined altitude value based only on one of the altitude inputs, or just the least significant digits of one of the altitude inputs. In at least some other embodiments, step 350 may use both altitude inputs (or the least significant digits from both altitude inputs) to calculate the least significant digits of the combined altitude value.

Examples of how such an apparatus, system, or method can work are now described, though the examples provided do not limit the various embodiments disclosed herein. Referring to FIG. 1B, in at least some embodiments, the apparatus 100 or altitude sources coupled to the input interfaces for a first and second altitude source 110, 120 may include calibration or calibration adjustments. The calibration may be used to adjust the altitude values before or after their receipt at the input interfaces 110, 120 or used to adjust the combined estimated altitude value 132 to be output by the output interface 130. Further, the combined estimated altitude value 132 may be adjusted based on calibration before or after being output by the output interface 130. For example, the combined estimated altitude value 132 may be adjusted based on local weather conditions (such as accounting for temperature or high or low pressure zones) before or after it is output by the output interface 130. As one example, the altitude sources may be calibrated prior to take-off based on a known altitude of 250 feet above sea level (such as on a runway or staging area). At the known altitude of 250 feet, the integer 112 representing the altitude from the first input interface 110 may be corrected +00250, while the unsigned integer 122 representing the altitude from the second input interface 120 may be corrected to 0250. The data fusion component 150 may output a combined estimated altitude value 132 of +00250, or the combined estimated altitude value 132 may be corrected to +00250.

By way of another example, referring to FIG. 1B, in at least some embodiments the combined estimated altitude value 132 is calculated by combining the sign and most significant digit(s) of integer 112 with unsigned integer 122. An integer 112 value of +15,468 and unsigned integer 122 value of 5,576 may be combined into a combined estimated altitude value 132 of +15,576 by combining the +1 information from the integer 112 with the 5,576 information from the unsigned integer 122. However, issues may arise if the difference between the least significant digits of integer 112 and the least significant digits of unsigned integer 122 exceed threshold amount. For example, an integer 112 value of +15,576 and an unsigned integer 122 value of 9,432 have a difference of 3,856 between their four least significant digits. In this example, if the allowable difference (i.e., threshold amount) is only 300, one or both of the altitude sources may be deemed inaccurate. Where the difference between least significant digits of the two input altitude values exceed the threshold amount, the apparatus 100 may default to providing the integer 112 value as the combined estimated value 132 and may also indicate (such as via a signal or setting an error flag) that an error occurred in combining the values. Another issue may arise when the unsigned integer is near a roll-over or roll-under condition. For example, an integer 112 value of +29,987 and an unsigned integer 122 value of 0,003 could be combined into +20,003 if only the sign and most significant digit of integer 112 were considered. In at least some embodiments, this issue may be corrected by considering additional most significant digits of integer 112. For example, considering enough most significant digits of integer 112, such that there is at least one digit of overlap between the considered digits of integer 112 and the considered digits of unsigned integer 122 (e.g., the "thousands" digit) would allow the data fusion component 150 to determine that the unsigned integer 122 is close to a roll-over or roll-under condition and calculate a more accurate combined estimated altitude value 132. In some embodiments, where the overlapping digit of the integer 112 is a 9 and the overlapping digit of the unsigned integer 122 is a 0, the next highest digit (e.g., the "tens of thousands" digit) of the combined estimated altitude value 132 may use an incremented value of the corresponding digit from the integer 112 (here, incrementing from a 2 to a 3), resulting in a combined estimated altitude value 132 of +30,003. Where the overlapping digit of the integer is 112 is a 0 and the overlapping digit of the unsigned integer 122 is a 9, the next highest digit of the combined estimated altitude value 132 may instead be the decremented value of the corresponding digit from the integer 112 (e.g., +10,023 and 9989 may be combined into +09,989).

By way of another example, referring to FIG. 1B, the data fusion component 150 may consider only the sign and most significant digit of the integer 112 along with all digits of the unsigned integer 122 in calculating the combined estimated altitude value 132. The least significant digits of the combined estimated altitude value 132 may be based on the unsigned integer 122. The sign and most significant digit(s) may be based on the roll-over or roll-under of the unsigned integer 122 and sign and most significant digit(s) 114 of the integer 112 (in FIG. 1B, only the tens of thousands digit is depicted). In the case where the tens of thousands digit is the most significant digit, the data fusion component 150 would only increment the tens of thousands digit of the combined estimated altitude value 132 when the unsigned integer 122 rolls over from 9999 to 0000 (and similarly would only decrement the tens of thousands digit of the combined estimated altitude value 132 when the unsigned integer 122 rolls under from 9999 to 0000). The most significant digit 114 could be required to be within plus or minus one of the corresponding digit of the combined estimated altitude value 132, else an error condition may exist due to the difference in estimated altitudes.

Changing between positive and negative elevations relative to sea level may also require a slight change in calculations. For example, if a change in integer 112 from +00,001 to −00,001 represents and two foot drop in altitude, but unsigned integer 122 would represent such a change as 0001 to 9999 when going from above sea level to below sea level, the apparatus 100 can combine the estimated altitude values 112, 122 differently when below sea level. Unsigned integer 112 may have a cyclical range, such that 0001 may represent 1 foot above sea level and 9999 may represent 1 foot below sea level. If apparatus 100 determines that the sign for the combined estimated altitude value 132 should be negative, the unsigned integer 122 may be adjusted to indicate the number of feet below sea level by subtracting the unsigned integer 122 from its maximum value plus one (e.g., 10,000 as disclosed in FIG. 1B). Thus a value of 9999 subtracted from 10,000 results in 1.

Figure 4:
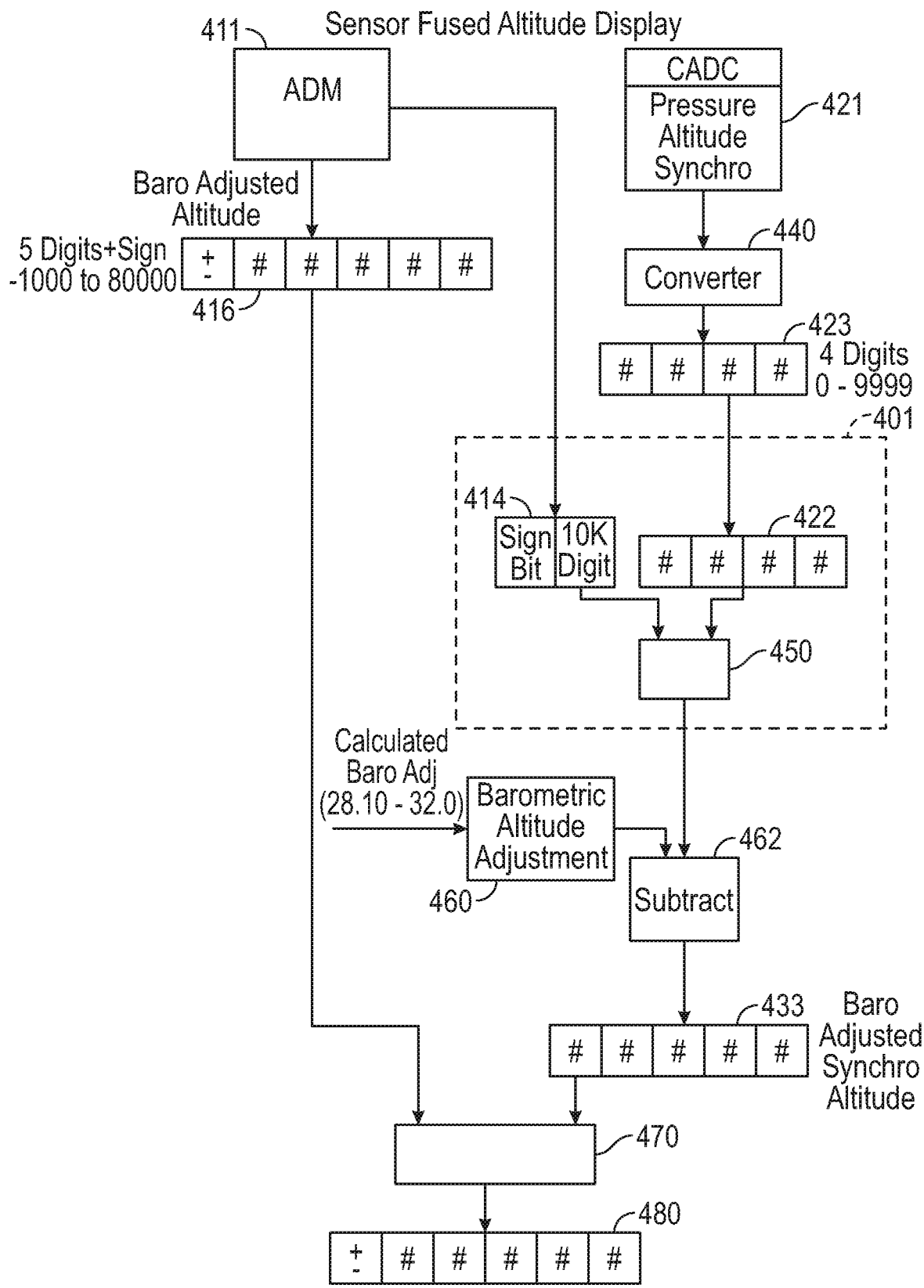
FIG. 4 shows a system for fusing two altitude sources, in accordance with various embodiments.

FIG. 4 shows a system for fusing two altitude sources, in accordance with various embodiments. One type of altimeter for aircraft is an Air Data Module (ADM) 411, which typically uses barometric pressure to calculate an estimated baro adjusted altitude 416. An ADM 411 may estimate the barometric pressure by measuring the static pressure at one or more points on the aircraft using static ports. Such an ADM 411 tends to have a large range of measurable altitude (e.g., −10,000 feet through 80,000 feet relative to sea level). An ADM 411 is typically calibrated while an aircraft is at a known altitude on the ground. However, the accuracy of an ADM 411 using barometric pressure may change in-flight as local weather conditions change or the aircraft crosses areas with different local weather conditions.

Another type of altimeter for aircraft is a Central Air Data Computer (CADC) 421, which utilizes various sensors to calculate air data for aircraft, including altitude. A CADC 421 may measure the static pressure at one or more points on the aircraft using static ports. A CADC 421 may compensate for static source sensing errors, such as transducer errors and position errors. Some CADCs 421 provide altitude information through a synchro interface. A synchro interface transmits an analog signal representative of an angle (0 through 360 degrees, with 0 and 360 being the same signal), which corresponds to altitude. For example, 0 degrees may correspond to 0000 feet, 180 degrees to 5000 feet, and 360 degrees to 10000 feet, though the analog signal cannot distinguish between 0000 feet and 10000 feet (or multiples thereof). Thus, when used to indicate altitude, the synchro interface may have a cyclical range between 0000 and 9999 feet. Such a CADC 421 may be able to operate over a larger altitude range, such as 0 through 80,000 feet, though due to the cyclical range of the synchro interface, the synchro interface would be unable to distinguish between increments of 10,000 feet of altitude. While the synchro interface may not report the tens of thousands of feet of altitude, the reported altitude information may be more accurate than other sources under certain conditions.

The ADM 411 may provide a baro adjusted altitude 416 that may include 5 digits and a sign with an operable range from −01,000 to +80,000 feet. Baro adjusted altitude 416 may be based on the measured barometric pressure, and may or may not already be adjusted for local weather conditions (e.g., high/low pressure zone and/or temperature). CADC 421 may provide an estimated altitude via a pressure altitude synchro. A converter 440 is similar to converter 140 and may be necessary to convert the signal from the pressure altitude synchro into a synchro altitude 423. The synchro altitude 423 may be represented by four digits and have a cyclical range from 0000 to 9999 that can roll-over and roll-under. The ADM 411 may also provide the sign and most significant digit 414 (here, the tens of thousands digit) of an unadjusted pressure altitude to a component for fusing two dissimilar altitude sources 401. The component 401 may also receive the synchro altitude 422, 423. The component 401 may include a data fusion component 450 similar to data fusion component 150. The data fusion component 450 that fuses the sign and most significant digit 414 of an unadjusted pressure altitude from the ADM 411 with a synchro altitude 422 from the pressure altitude synchro of a CADC 421. The calculated altitude from the data fusion component 450 may then be adjusted by subtracting 462 (or in some cases adding) a barometric altitude adjustment 460 calculated based on local weather conditions (such as high/low pressure zones and/or temperature) to produce a baro adjusted synchro altitude 433. Comparator 470 may then compare the baro adjusted altitude 416 with the baro adjusted synchro altitude 433 to determine which value to send to an altitude display 480. Comparator 470 may base its determination on the relative closeness of the two altitude values are 416, 433. If the two altitude values 416, 433 are sufficiently close (e.g., the difference between them is less than a predetermined value or less than a percentage of one of the values), the comparator 470 may send the baro adjusted synchro altitude 433 to the altitude display 480, else it may send the baro adjusted altitude 416 to the altitude display 480. The predetermined value may be a number of feet (or meters, or another expression of altitude units) or determined during testing or calibration to indicate an error has occurred in an altimeter or the altitude fusion. In various embodiments, the comparator 470 may send an altitude type identifier to the altitude display 480. The altitude type identifier indicates whether the sent altitude data is the baro adjusted altitude 416 or the baro adjusted synchro altitude 433. The comparator 570 may consider additional factors in making its determination, such as signals indicating whether the baro adjusted altitude 416 from the ADM 411 or the pressure altitude synchro value from the CADC 412 are valid. The altitude display 480 may display the altitude as a sign and 5 digits. The altitude display 480 may be a digital liquid crystal display (LCD) dedicated to displaying the altitude or part of a larger display. The altitude display 480 may also indicate the altitude type on the display and whether the displayed altitude is the baro adjusted altitude 416 or the baro adjusted synchro altitude 433.

Figure 5:
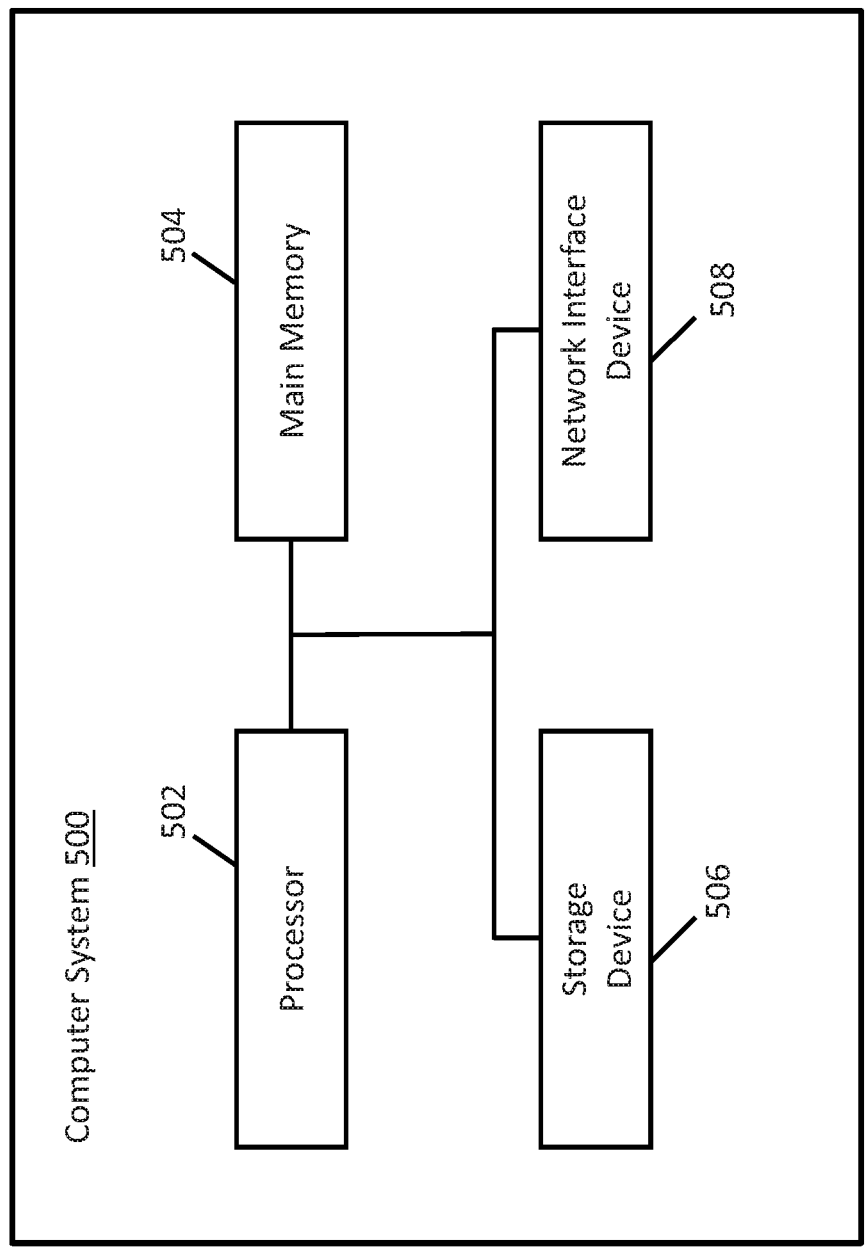
FIG. 5 shows a computer system, in accordance with various embodiments.

FIG. 5 shows a computer system 500, which is illustrative of a computer system that may be used in connection with the various embodiments disclosed herein. The computer system 500 may be illustrative of, for example, a laptop, a desktop computer, a computer within a node of several computers, or any other computing system that may be connected to a network of computers. The computer system 500 comprises a processor 502, and a main memory 504 coupled to processor 502. Additionally, processor 502 and main memory 504 may be coupled to storage device 506, and a network interface device 508.

Programs executable by the processor 502 may be stored on the storage device 506 (e.g., a hard drive, solid state disk, memory stick, optical disc), and accessed when needed by the processor 502. Programs stored on the storage device 506 may comprise programs to implement various processes on the computer system 500. In some cases, the programs are copied from the storage device 506 to the main memory 504, and the programs are executed from the main memory 504. Thus, both the main memory 504 and storage device 506 shall be considered computer-readable storage mediums.

In various embodiments, network interface device 508 may allow computer system 500 to exchange data over a wireless or wired network. In some embodiments the computer system 500 may be connected to a plurality of other computers within a shared network. Thus, while many aspects may be performed serially, various embodiments enable parallel processing to speed up the overall processing time.

The apparatus 100 depicted in FIG. 1A or 1B or parts of the system depicted in FIG. 4 may be implemented in a computer system 500. The input interfaces for the first and second altitude sources 110, 120 may be implemented as part of a bus between the processor 502 and the other components or as part of the network interface device 508. The data fusion component 150 and converter 140 may be implemented by computer code stored in main memory 504 and executed by the processor 502.

From the description provided herein, those skilled in the art are readily able to combine software with appropriate general-purpose or special-purpose computer hardware to create a computer system and/or computer subcomponents in accordance with the various embodiments and methods.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The above discussion is meant to be illustrative of the principles and various embodiments of the present invention. Numerous variations and modifications will become apparent to those skilled in the art once the above disclosure is fully appreciated.

What is claimed is:

1. An apparatus comprising:
  a first altitude input interface, wherein the first altitude input interface receives a first altitude value;
  a second altitude input interface, wherein the second altitude input interface receives a second altitude value, wherein the second altitude value indicated by the second altitude input interface has a cyclical range of one or multiple 0 to 360 degree angles;
  a data fusion component coupled to the first altitude input interface and the second altitude input interface and configured to calculate a third altitude value based on the first altitude value and the second altitude value; and
  an altitude output interface coupled to the data fusion component, wherein the altitude output interface outputs the third altitude value.

2. The apparatus of claim 1,
  wherein the first altitude value comprises a first altitude value sign, one or more most significant digits of the first altitude value, and one or more least significant digits of the first altitude value,
  wherein the third altitude value comprises a third altitude value sign, one or more most significant digits of the third altitude value, and one or more least significant digits of the third altitude value,
  wherein the data fusion component calculates the least significant digits of the third altitude value based on the second altitude value, and
  wherein the data fusion component calculates the third altitude value sign and most significant digits of the third altitude value based on the first altitude value sign, most significant digits of the first altitude value, and a roll-over or a roll-under of the second altitude value.

3. The apparatus of claim 2, wherein the number of the most significant digits of the first altitude value is the same as the number of the most significant digits of the third altitude value.

4. The apparatus of claim 2, wherein the number of the least significant digits of the first altitude value is the same as the number of the least significant digits of the third altitude value.

5. The apparatus of claim 2, wherein the number of the most significant digits of the first altitude value is 1.

6. The apparatus of claim 2, wherein the number of the most significant digits of the first altitude value is 2.

7. The apparatus of claim 2, wherein the first altitude input interface receives the first altitude value from an air data module.

8. The apparatus of claim 7, wherein the second altitude input interface receives the second altitude value from a central air data computer.

9. A method, comprising the steps of:
  receiving, by a first input interface, a first altitude value;
  receiving, by a second input interface, a second altitude value, wherein the second altitude value has a cyclical range;
  calculating, by a data fusion component, at least one most significant digit of a third altitude value based on at least one digit of the first altitude value and on a roll-over or roll-under of the second altitude value; and outputting the third altitude value.

10. The method of claim 9, wherein calculating the third altitude value based on the first altitude value and the second altitude value comprises:
calculating a sign of the third altitude value based on the second altitude value, a sign of the first altitude value, and one or two digits of the first altitude value;
calculating one or more most significant digits of the third altitude value based on the second altitude value and one or two digits of the first altitude value; and
calculating one or more least significant digits of the third altitude value based on the second altitude value.

11. The method of claim 9, wherein calculating the third altitude value based on the first altitude value and the second altitude value comprises:
calculating a sign of the third altitude value based on a sign of the first altitude value, one or more digits of the first altitude value, and a roll-over or a roll-under of the second altitude value;
calculating one or more most significant digits of the third altitude value based on one or more digits of the first altitude value and the roll-over or the roll-under of the second altitude value; and
calculating one or more least significant digits of the third altitude value based on the second altitude value.

12. The method of claim 9, wherein receiving, by the first input interface, the first altitude value comprises receiving the first altitude value via an air data module.

13. The method of claim 12, wherein receiving, by the second input interface, the second altitude value comprises receiving the second altitude value via a central air data computer.

14. The method of claim 9, further comprising:
receiving, by the second input interface, one or more synchro signals; and
converting the one or more synchro signals into the second altitude value.

15. A computer system comprising:
a processor;
a memory coupled to the processor, wherein the memory stores a program that, when executed by the processor, causes the processor to:
receive a first altitude value;
receive a second altitude value, wherein the second altitude value has a cyclical range; and
calculate at least one most significant digit of a third altitude value based on at least one digit of the first altitude value and on a roll-over or a roll-under of the second altitude value.

16. The computer system of claim 15, wherein the program, when executed by the processor, causes the processor to calculate the third altitude value by causing the processor to:
calculate a sign of the third altitude value based on the second altitude value, a sign of the first altitude value, and one or two digits of the first altitude value;
calculate one or more most significant digits of the third altitude value based on the second altitude value and one or two digits of the first altitude value; and
calculate one or more least significant digits of the third altitude value based on the second altitude value.

17. The computer system of claim 15, wherein the program, when executed by the processor, causes the processor to calculate the third altitude value by causing the processor to:
calculate a sign of a third altitude value based on a sign of the first altitude value, one or more digits of the first altitude value, and a roll-over or a roll-under of the second altitude value;
calculate one or more most significant digits of the third altitude value based on one or more digits of the first altitude value and the roll-over or the roll-under of the second altitude value; and
calculate one or more least significant digits of the third altitude value based on the second altitude value.

18. The computer system of claim 15, wherein the program, when executed by the processor, further causes the processor to:
calculate a barometric altitude adjustment based on local weather conditions; and
calculate the third altitude value based in part on the barometric altitude adjustment.

19. The computer system of claim 15, wherein the program, when executed by the processor, further causes the processor to output the third altitude value and an altitude type identifier to a display, wherein the altitude type identifier indicates whether a displayed altitude is a baro adjusted altitude or a baro adjusted synchro altitude.

20. The computer system of claim 15, wherein the program, when executed by the processor, further causes the processor to:
receive a fourth altitude value;
determine whether the first altitude value and the third altitude value differ by more than a predetermined value;
output the third altitude value when the first altitude value and the third altitude value differ by less than the predetermined value; and
output the first altitude value when the first altitude value and the third altitude value differ by more than the predetermined value.

* * * * *